United States Patent [19]

Fujimoto et al.

[11] Patent Number: 5,065,705

[45] Date of Patent: Nov. 19, 1991

[54] SYSTEM FOR PREVENTING OVERHEAT OF ENGINE FOR VEHICLE

[75] Inventors: Sachito Fujimoto; Yuzuru Koike, both of Saitama, Japan

[73] Assignee: Honda Giken Kogyo Kabushiki Kaisha, Tokyo, Japan

[21] Appl. No.: 551,980

[22] Filed: Jul. 12, 1990

[30] Foreign Application Priority Data

Jul. 14, 1989 [JP] Japan .................................. 1-82795

[51] Int. Cl.[5] .............................................. F01P 5/14

[52] U.S. Cl. ............................ 123/41.15; 123/198 D

[58] Field of Search ............ 123/41.13, 41.15, 198 D, 123/198 DB, 198 DC, 335

[56] References Cited

U.S. PATENT DOCUMENTS 4,459,951 7/1984 Tobinaga et al. ............... 123/41.15

4,629,471 12/1986 Kurihara et al. ................ 123/41.15

FOREIGN PATENT DOCUMENTS 0149902 7/1985 European Pat. Off. .

*Primary Examiner*—Noah P. Kamen

*Attorney, Agent, or Firm*—Armstrong, Nikaido, Marmelstein, Kubovcik & Murray

[57] ABSTRACT

A system for preventing overheating of an engine for a vehicle includes a revolution rate detector for detecting the rate of revolution of the engine carried on the vehicle, a device for reducing an engine power output in response to a value detected in the revolution rate detector exceeding a preset revolution rate, a device for predicting overheating of the engine, and a preset revolution rate correcting device for reducing the preset revolution rate in accordance with a reduction of the vehicle velocity in reply to prediction of an engine overheat condition by the overheat predicting device. An overheating due to an engine racing condition during vehicle travelling is prevented in view of an engine cooling effect provided by flowing air.

3 Claims, 3 Drawing Sheets

Detection of NE
Generation of NEO
Detection of V
Detection of TW
Adding
Determination of NEV
Timer
Reduction of power output
Clock signal
Up-down counter
D
U
ΔNE
NE
NEO
NEVC
NEV
V
TW
TWH
TWL
1
2
3
4
5
6
7
8
9
10
11
12
13
14
15
16
17
18
19
20
21

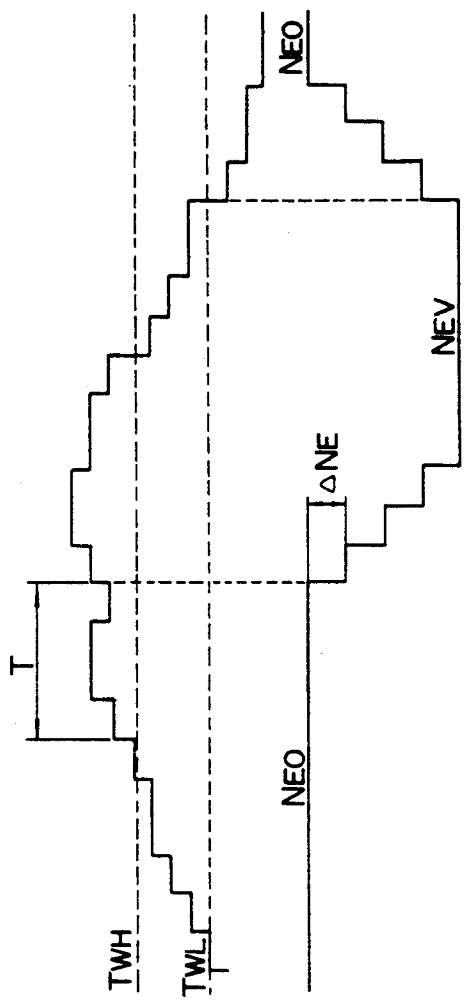
FIG. 3(a) OUTPUT FROM WATER-TEMPERATURE DETECTOR (TW)
FIG. 3(b) OUTPUT FROM PRESET REVOLUTION RATE CHANGEOVER MEANS (NEVC)

SYSTEM FOR PREVENTING OVERHEAT OF ENGINE FOR VEHICLE

BACKGROUND OF THE INVENTION

1. Field of the Invention

The field of the invention is a system for preventing overheating, of an engine for a vehicle, comprising a detector for measuring the engine rotation speed and a power output reducing means for reducing an engine power output in response to a value detected in the revolution rate detector exceeding a preset revolution rate.

2. Description of the Prior Art

Systems of this type are conventionally known, for example, from Japanese Patent Application Laid-open No. 66839/86. In such a prior art system, to prevent overheating when the engine is unnecessarily racing, such as when the vehicle is stopped, a preset engine speed (revolution rate) which controls fuel cut-off is gradually reduced in response to lowering in the actual engine speed, so as to reduce power output.

The above system is intended to be operated when the vehicle is stopped. However, the engine tends to overheat during travelling of the vehicle and hence, a system for preventing such overheating is desired. Moreover, during vehicle travel the engine can be cooled by air flowing into an engine room, and it is preferable that the engine overheating is prevented with use of a cooling effect provided by the flowing or travelling air.

SUMMARY OF THE INVENTION

The present invention has been accomplished with such circumstances in view, and it is an object of the present invention to provide a system for preventing overheating of an engine for a vehicle, wherein overheating due to a racing condition of the engine during travelling of the vehicle is prevented in consideration of flowing air.

To achieve the above object, according to the present invention, there is proposed an overheat preventing system of the above-described type, comprising a detector for detecting a vehicle velocity, a means for predicting overheating of the engine, and a means for reducing the preset revolution rate in accordance with a reduction in the vehicle velocity in reply to prediction of an engine overheating by the overheat predicting means.

With such a construction, since the preset revolution rate is reduced in response to a reduction of the vehicle velocity, the power output is reduced at a relatively high engine revolution rate when a vehicle is travelling at a high speed which permits a large cooling effect to be provided by flowing air, and at a relatively low engine revolution rate when the vehicle is travelling at a low speed in which as great a cooling effect by the travelling air cannot be expected, engine overheating is prevented in this manner.

In addition, if the means for reducing the preset revolution rate is arranged so s to gradually reduce the preset revolution rate to a value which corresponds to a vehicle velocity, it becomes possible to prevent the engine speed from lowering suddenly during travelling of the vehicle to prevent deterioration of the operating performance.

In addition, fi the overheat predicting means is arranged to decide that overheating is predicted when the engine-cooling water temperature has exceeded a preset temperature for a predetermined time, it is possible with a simple construction to predict that the engine is likely to be overheated.

The above and other objects, features and advantages of the invention will become apparent from reading of the following description of the preferred embodiment, taken in conjunction with the accompanying drawings.

BRIEF DESCRIPTION OF THE DRAWINGS

The Drawings illustrate one embodiment of the present invention, wherein

FIG. 3 is a cart of timing of the output from a water temperature detector and the output from a preset revolution rate correcting means.

DETAILED DESCRIPTION OF THE PREFERRED EMBODIMENT

Figure 1:
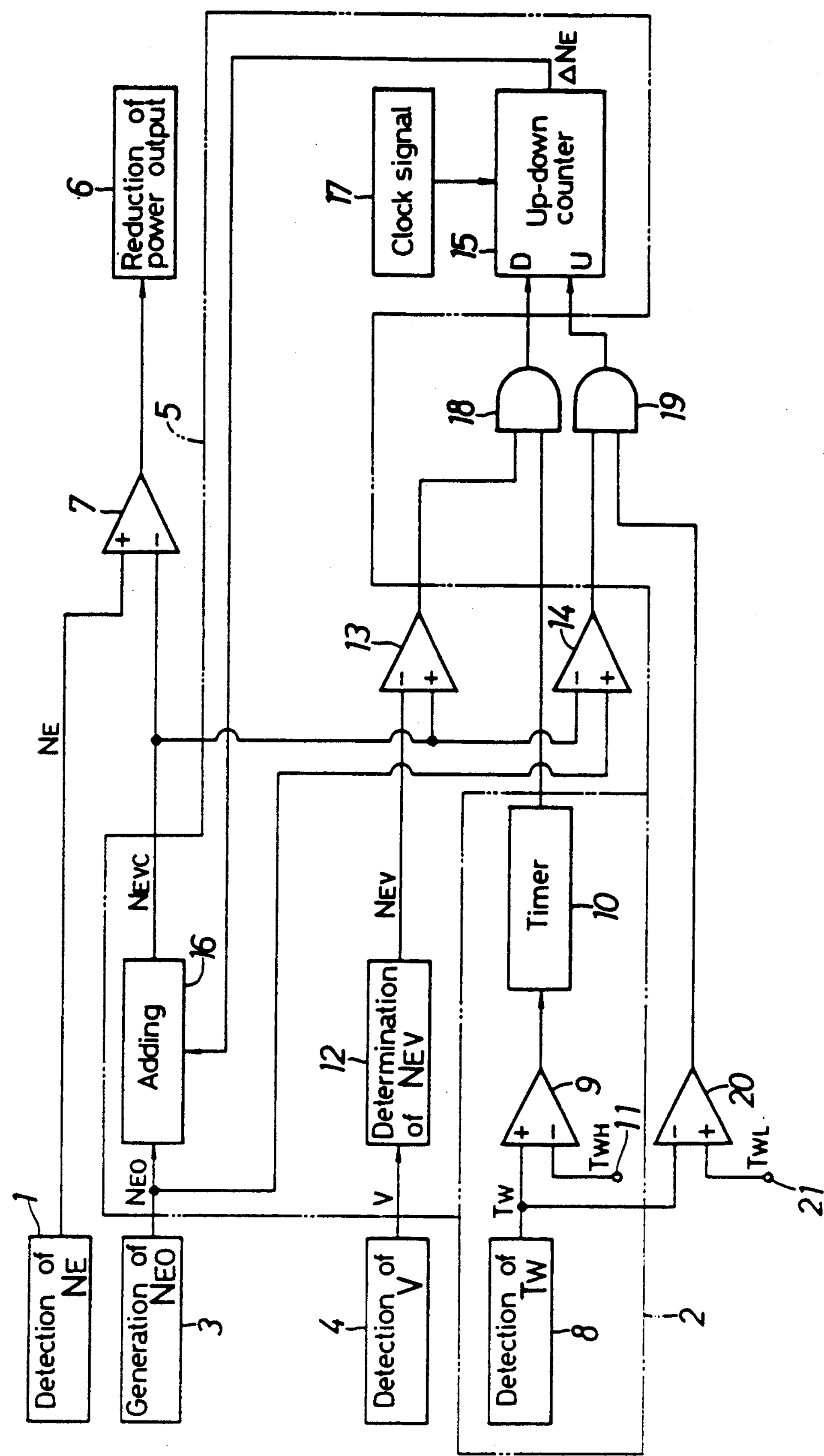
FIG. 1 is a block diagram illustrating the arrangement of a system according to the preferred embodiment.

The present invention will now be described by way of one embodiment with reference to the accompanying drawings. First referring to FIG. 1, the rate $N_E$ of revolution of an engine carried on a vehicle is detected by a revolution rate detector 1. When overheating of the engine is predicted by an overheat predicting means 2, a given power output-reducing revolution rate $N_{EO}$ delivered from a power output-reducing engine revolution rate generating circuit 3 is corrected by a preset revolution rate correcting means 5 in accordance with a vehicle velocity V detected in a vehicle velocity detector 4. If the comparison of a corrected preset revolution rate $N_{EVC}$ corrected by the set revolution rate correcting means 5 with the revolution rate $N_E$ results in $N_E > N_{EVC}$, then an engine power output is reduced by an output reducing means 6.

The revolution rate $N_E$ detected by the revolution rate detector is inputted to a non-inverted input terminal of a comparator circuit 7. An output from the comparator circuit 7 is inputted to the power output reducing means 6 which reduces the engine power output in response to a high level signal received therein from the comparator circuit 7. The power output reducing means 6 used may be a means for cutting off the supply of fuel to the engine, a means for regulating the throttle opening degree to reduce the amount of fuel-air mixture supplied to the engine, or a means for cutting off the ignition of the engine.

A given power output-reducing revolution rate $N_{EO}$, e.g., 7000 rpm is set in the power output reducing revolution rate generating circuit 3, and a signal corresponding to 7000 rpm is applied to the set revolution rate correcting means 5. The vehicle velocity V detected in the vehicle velocity detector 4 is also applied to the preset revolution rate correcting means 5.

The overheat predicting means 2 is comprised of a water temperature detector 8 for detecting the temperature Tw of an engine-cooling water, a comparator circuit 9, and a timer 10. A signal corresponding to the engine-cooling water temperature Tw detected by the water temperature detector 8 is supplied to a non-inverted input terminal of the comparator circuit 9, and a signal corresponding to a preset high water temperature $T_{WH}$, e.g., 110° C., is supplied from a reference terminal 11 to an inverted input terminal of the comparator circuit 9. An output from the comparator circuit 9 is supplied to the timer 10. The timer 10 is adapted to produce a high level signal when a high level signal has been inputted thereto from the comparator circuit 9 for a preset given time T, e.g., 20 seconds. More specifically, the overheat predicting means 2 is arranged such that a high level signal is delivered from the timer 10 based on a decision that overheating is predicted in response to a condition of the engine-cooling water temperature $T_W$ exceeding the set temperature $T_{WH}$ having continued for a predetermined period of time (20 seconds).

The preset revolution rate correcting means 5 comprises an engine revolution rate determining circuit 12 for determining an engine revolution rate $N_{EV}$ corresponding to the vehicle velocity V inputted from the vehicle velocity detector 4, comparator circuits 3 and 14, an up-down counter 15, and an adder circuit 16.

Figure 2:
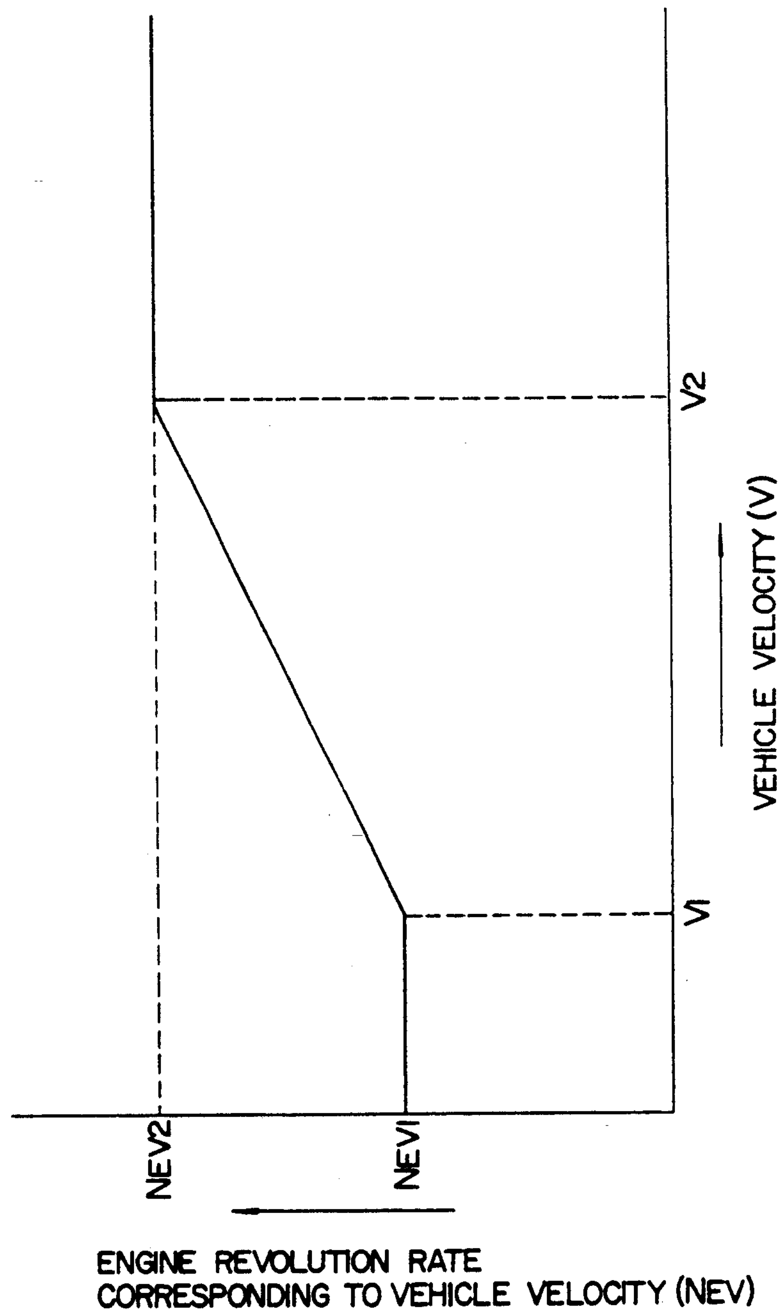
FIG. 2 is a graph illustrating the preset engine revolution rate corresponding to a vehicle velocity.

In the engine revolution rate determining circuit 12, the engine revolution rate $N_{EV}$ corresponding to the vehicle velocity V is preset as shown in FIG. 2. The engine revolution rate determining circuit 12 searches for an engine revolution rate $N_{EV}$ corresponding to the vehicle velocity V to deliver it. As shown in FIG. 2, the engine revolution rate $N_{EV}$ corresponding to the vehicle velocity is constant at $N_{EV1}$ (e.g , of 5000 rpm) until the vehicle velocity V reaches a first preset vehicle velocity V1, e.g., 10 km/H, and the engine revolution rate $N_{EV}$ corresponding to the vehicle velocity also becomes constant at $N_{EV2}$ (e.g., of 7000 rpm) after the vehicle velocity V exceeds a second vehicle velocity V2 larger than the first vehicle velocity V1, e.g., 30 km/H. Between the first and second vehicle velocities V1 and V2, the engine revolution rate $N_{EV}$ corresponding to the vehicle velocity varies proportionally between $N_{EV1}$ and $N_{EV2}$.

The up-down counter 15 comprises a down input terminal D and an up input terminal U, and a clock signal is supplied from a clock signal generating circuit 17 to the up-down counter 15. When a high level signal is received in the down input terminal D, the up-down counter 15 produces an adding value $\Delta N_E$ with a negative sign affixed thereto for every clock signal received from the clock signal generating circuit 17, while when a high level signal is received in the up input terminal U, the up-down counter 15 produces an adding value $\Delta N_E$ with a positive sign affixed thereto for every clock signal from the clock signal generating circuit 17. The negative or positive sign-affixed adding value $\Delta N_E$ from the up-down counter 15 is inputted to the adder circuit 16.

The power output reducing engine revolution rate $N_{EO}$ from the power output-reducing engine revolution rate generating circuit 3 and the negative or positive sign-affixed adding value $\Delta N_E$ from the up-down counter 15 are inputted to the adder circuit 16, and a corrected preset engine revolution rate $N_{EVC}$ in which the adding value $\Delta N_E$ is added to the power output reducing engine revolution rate $N_{EO}$ is outputted from the adder circuit 16, i.e., from the preset revolution rate correcting means 65 and is inputted to the inverted input terminal of the comparator 7.

An output from the adder circuit 16 is supplied to a non-inverted input terminal of the comparator circuit 13, and an output from the engine revolution rate determining circuit 12 is supplied to an inverted input terminal of the comparator circuit 13. Therefore, in a condition in which the corrected preset engine revolution rate $N_{EVC}$ exceeds the engine revolution rate $N_{EV}$ corresponding to the vehicle velocity, a high level signal is produced from the comparator circuit 13. An output from the power output reducing engine revolution rate generating circuit 3 is supplied to a non-inverted input terminal of the comparator circuit 14, and an output from the adder circuit 16 is supplied to an inverted input terminal of the comparator circuit 14. Therefore, in a condition in which the corrected preset engine revolution rate NVC is less than the power output reducing engine revolution rate $N_{EO}$, a high level signal is produced from the comparator circuit 14.

An output from an AND circuit 18 is supplied to the up-down counter 15. Moreover, outputs from the comparator circuit 13 and the timer 10 are inputted to the AND circuit 18. When it is decided that the overheat predicting means 2 has predicted an overheat condition and when the corrected preset engine revolution rate $N_{EVC}$ has exceeded the engine revolution rate $N_{EV}$ corresponding to the vehicle velocity, a high level signal is delivered from the AND circuit 18 to the down input terminal D of the up-down counter 15.

An output from an AND circuit 19 is supplied to the up input terminal U of the up-down counter 15. Outputs from the comparator circuits 14 and 20 are supplied to the AND circuit 19. A detected value provided in the water temperature detector 8 is inputted to an inverted input terminal of the comparator circuit 20, and a signal corresponding to a preset low water temperature $T_{WL}$, e.g., 100° C. is supplied from a reference terminal 21 to a non-inverted input terminal of the comparator circuit 20. Therefore, when the corrected preset engine revolution rate $N_{EVC}$ is smaller than the power output reducing engine revolution rate $N_{EO}$ and moreover when the engine-cooling water temperature $T_W$ is lower than the low water temperature $T_{WL}$, a high level signal is delivered from the AND circuit 19 to the up input terminal of the up-down counter 15.

The operation of this embodiment will be described below. In a condition in which the engine-cooling water temperature $T_W$ is in a relationship represented by an expression $T_{WL} \leqq T_W \leqq T_{WH}$, each of the outputs from the AND circuits 18 and 19 is of a low level, and the up-down counter 15 is not operated. Accordingly, the power output reducing engine revolution rate $N_{EO}$ from the power output reducing engine revolution rate generating circuit 3 is outputted from the preset revolution rate correcting means 5 without connection and compared with the engine revolution rate $N_E$ in the comparator circuit 7. If $N_E \leqq N_{EO}$, the power output reducing means 6 is not operated, whereas when the engine revolution rate $N_E$ has exceeded the power output reducing engine revolution rate $N_{EO}$, the power output reducing means 6 is operated to reduce the engine power output down to a level of the power output reducing engine revolution rate $N_{EO}$.

When the engine-cooling water temperature $T_W$ has exceeded the high water temperature $T_{WH}$ as shown in FIG. 3 at (a) and such a condition has been sustained for the time T set in the timer 10, the overheat predicting means 2 predicts that the engine is likely to be overheated and produces a high level signal at such time. In this case, if the engine revolution rate $N_{EV}$ corresponding to the vehicle velocity V falls below the corrected preset revolution rate $N_{EVC}$ outputted from the adder circuit 16, the negative sign-affixed adding value $\Delta N_E$ is outputted from the up-down counter 15 for each clock signal, because the output from the AND circuit 18 is at the high level. And the corrected preset engine revolution rate $N_{EVC}$ outputted from the adder circuit 16 and thus from the preset revolution rate correcting means 5 is gradually reduced until it reaches the level of the engine revolution rate $N_{EV}$, as shown in FIG. 3 at (b).

When the engine revolution rate $N_E$ has exceeded a value $N_{EVC}$ resulting from gradual reduction of the power output reducing preset engine revolution rate $N_{EO}$ in this manner, the engine power output is reduced by means of the power output reducing means 6. More specifically, on the basis of the corrected preset engine revolution rate $N_{EVC}$ which is determined to become lower in response to lowering of the vehicle velocity V, it is decided whether or not the engine power output is reduced. Therefore, the engine power output can be reduced at a relatively high engine revolution rate $N_E$ during a high speed travelling of a vehicle where cooling by flowing air can be expected to prevent any overheating of the engine, and the engine power output can be reduced at a relatively low engine revolution rate $N_E$ during a low speed travelling where such cooling by the flowing air cannot be expected to prevent any overheating of the engine. Moreover, because the corrected preset engine revolution rate $N_{EVC}$ can be gradually reduced, the engine power output is prevented from suddenly reducing and hence, it is possible to avoid deterioration in operating performance.

When the engine-cooling water temperature $T_W$ has become lower than the low water temperature $T_{WL}$ after reduction of the corrected preset engine revolution rate $N_{EVC}$ to the level of the engine revolution rate $N_{EV}$ corresponding to the vehicle velocity, the positive sign-affixed adding value $\Delta N_E$ is outputted from the up-down counter 15 for each clock signal in response to the output from the AND circuit 19 becoming high, whereby the corrected preset revolution rate $N_{EVC}$ outputted from the adder circuit 16 is gradually increased to the power output reducing engine revolution rate up to a level of $N_{EO}$.

In the above embodiment, when the engine-cooling water temperature $T_W$ has exceeded the high water temperature $T_{WH}$ for a predetermined time T, it is decided that overheating is likely to occur, but it will be understood that it may be decided that overheating is likely to occur when the engine revolution rate $N_E$ has exceeded the power output reducing engine revolution rate $N_{EO}$ for a predetermined time T.

What is claimed is:

1. A system for preventing an overheat condition of an engine for a vehicle, comprising:

a revolution rate detector for detecting a rate of revolution of the engine;

a power output reducing means receiving an output of said revolution rate detector for reducing engine power output when a revolution rate detected by said revolution rate detector exceeds a preset revolution rate;

a vehicle velocity detector for detecting a vehicle velocity;

an overheat condition predicting means for predicting an impending overheat condition of the engine; and a revolution rate correcting means for reducing said preset revolution rate in accordance with a reduction of the vehicle velocity in response to prediction of an impending engine overheat condition by said overheat condition predicting means.

2. A system for preventing an overheat condition of an engine for a vehicle according to claim 1, wherein aid revolution rate correcting means is arranged to gradually reduce said preset revolution rate to a corrected engine revolution rate set as a function of the detected vehicle velocity.

3. A system for preventing an overheat condition of an engine for a vehicle according to claim 1 or 2, wherein said overheat condition predicting means is arranged to predict an impending overheat condition in response to a continuing existence of a condition in which an engine-cooling water temperature of the vehicle exceeds a preset temperature for a predetermined length of time.

* * * * *